United States Patent [19]

Tsurumoto

[11] Patent Number: 5,764,179
[45] Date of Patent: Jun. 9, 1998

[54] COMBINATION OF ELECTRONIC APPARATUS AND REMOTE CONTROLLER, REMOTE CONTROLLER FOR CONTROLLING ELECTRONIC APPARATUS AND METHOD OF REMOTE-CONTROLLING ELECTRONIC APPARATUS

[75] Inventor: Takashi Tsurumoto, Saitama, Japan

[73] Assignee: Sony Corporation, Tokyo, Japan

[21] Appl. No.: 731,165

[22] Filed: Oct. 10, 1996

[30] Foreign Application Priority Data

Oct. 11, 1995 [JP] Japan .................. 7-262689

[51] Int. Cl.$^6$ ........................ G08C 21/00
[52] U.S. Cl. ............ 341/176; 345/173; 345/157; 348/739
[58] Field of Search ............ 341/176, 33; 345/163, 345/173, 174, 157, 158; 348/731, 739

[56] References Cited

U.S. PATENT DOCUMENTS 5,543,588  8/1996  Bisset ........................... 178/18
5,594,509  1/1997  Florin ........................... 348/731

*Primary Examiner*—Michael Horabik
*Assistant Examiner*—Albert K. Wong
*Attorney, Agent, or Firm*—Frommer Lawrence & Haug LLP; William S. Frommer

[57] ABSTRACT

A combination of an electronic apparatus and a remote controller for controlling the electronic apparatus is arranged so that one of various functions can be selected speedily and reliably. A pad of a remote controller is operated with a finger to obtain position coordinates, and a cursor displayed on a display unit provided in or connected to an electronic apparatus is moved according to the position coordinates. A certain area is set at a center of the display screen of the display unit. By turning on a switch of the remote controller while positioning the cursor in this area, a channel-tuning and sound volume operation picture, an audio mode operation picture, a video input operation picture, an image quality control operation picture and a tone control operation picture are selected one after another.

21 Claims, 18 Drawing Sheets

COMBINATION OF ELECTRONIC APPARATUS AND REMOTE CONTROLLER, REMOTE CONTROLLER FOR CONTROLLING ELECTRONIC APPARATUS AND METHOD OF REMOTE-CONTROLLING ELECTRONIC APPARATUS

BACKGROUND OF THE INVENTION

1. Field of the Invention

The present invention relates to a combination of an electronic apparatus and a remote controller for controlling the electronic apparatus and to a remote controller and a method for controlling an electronic apparatus. More particularly, the present invention relates to a combination of an electronic apparatus and a remote controller, a remote controller and a remote control method arranged to improve the facility with which the electronic apparatus is operated.

2. Description of the Related Art

Recently, almost all television receivers have been designed so as to be remote-controlled with a remote commander. Ordinarily, such a remote commander is provided with various buttons corresponding to various functions and a user selects and operates some of the buttons previously related to some of the functions to make a television receiver perform a predetermined operation.

However, with the increase in the number of functions of television receivers, the number of buttons provided in remote commanders has been increased. When a user makes a television receiver having many functions operate in accordance with a predetermined one of the functions, it is necessary for the user to select and operate one of a number of buttons corresponding to the function. Thus, remote commanders are becoming difficult to operate speedily and reliably. Some devices have therefore been made to reduce the number of remote commander buttons.

One device made for this purpose comprises displaying buttons on a television receiver and providing up and down buttons and a selecting button in a remote commander. In this case, when the up or down button is operated, one of the buttons displayed on the screen of the television receiver is successively selected in an upward or downward direction (by being displayed in a color different from a color in which the buttons not selected are displayed). When the desired button is selected, the selecting button is operated. When the selecting button is operated, the function corresponding to the selected button is executed.

A device called air mouse has also been proposed which comprises displaying on a television receiver a number of buttons and a cursor for designating a predetermined one of the buttons. When a user directs the air mouse to a predetermined position on the television receiver, the cursor is moved to the position to which the air mouse is directed. When a clicking operation is performed with the cursor moved onto the desired button, the function corresponding to the button is executed.

The above-described method using up and down buttons, however, requires certain steps for selecting the desired button including passing a number of buttons one after another, i.e., an increased number of necessary operations till the completion of selecting the desired button.

According to the method using the air mouse, the desired button can be directly selected since the cursor can be moved in an arbitrary direction. However, it is difficult to position the cursor on the desired button because of a hand shake which occurs when the remote commander is directed to the television receiver. As a result, it is difficult to select the desired program speedily and reliably.

SUMMARY OF THE INVENTION

In view of these circumstances, an object of the present invention is to realize a combination of an electronic apparatus and a remote controller operable with improved facility and capable of executing a desired function speedily and reliably.

To achieve this object, according to one aspect of the present invention, there is provided a combination of an electronic apparatus and a remote controller for controlling the electronic apparatus, the remote controller comprising a pad for designating coordinates by being touched by a user, encoding means for encoding coordinate information designated by the pad, a switch operated by the user, and output means for outputting the encoded coordinate information and operation information of the switch as a control signal, the electronic apparatus comprising receiving means for receiving the control signal from the remote controller, and control means for controlling the electronic apparatus, the control means displaying, according to the received control signal, a cursor and an operation picture for operating the electronic apparatus on a display unit provided in or connected to the electronic apparatus.

According to another aspect of the present invention, there is provided a remote controller for controlling an electronic apparatus comprising a pad for designating coordinates by being touched by a user, encoding means for encoding coordinate information designated by the pad, a switch operated by the user, and output means for outputting the encoded coordinate information and operation information of the switch as a control signal.

According to still another aspect of the present invention, there is provided a method of remote-controlling an electronic apparatus comprising a first step of detecting coordinates of a position on a pad provided on a remote controller, at which position the pad is touched by a user, a second step of encoding coordinate information detected in the first step, a third step of detecting, as operation information, whether a switch provided in the remote controller has been operated by the user, a fourth step of outputting the encoded coordinate information and the detected operation information of the switch as a control signal, a fifth step of receiving the output control signal, and a sixth step of displaying, according to the received control signal, a cursor and an operation picture for operating the electronic apparatus on a display unit provided in or connected to the electronic apparatus.

DESCRIPTION OF THE PREFERRED EMBODIMENT

Figure 1:
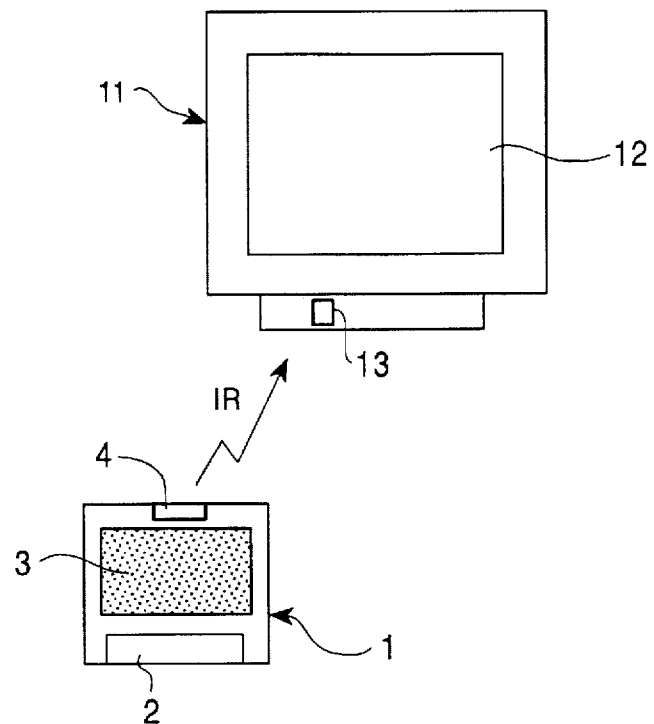
FIG. 1 is a diagram showing the configuration of a television receiver and a remote commander of the present invention.

FIG. 1 shows the configuration of a combination of a television receiver 11 and a remote commander 1 which represents an embodiment of the present invention. The television receiver 11 has a cathode ray tube (CRT) 12 and a light receiving unit 13 provided on its front side. The CRT 12 displays images, and the light receiving unit 13 receives a remote control signal in the form of light, which is an infrared ray (IR) signal.

The remote commander 1 has a switch 2 which is turned on or off, and a glide point (pad) 3 having a surface on which a finger is glided to input a position. Signals corresponding to the operations of the switch 2 and the pad 3 are emitted as infrared ray signals from a light emitting unit 4 to the light receiving unit 13 of the television receiver 11.

Figure 2:
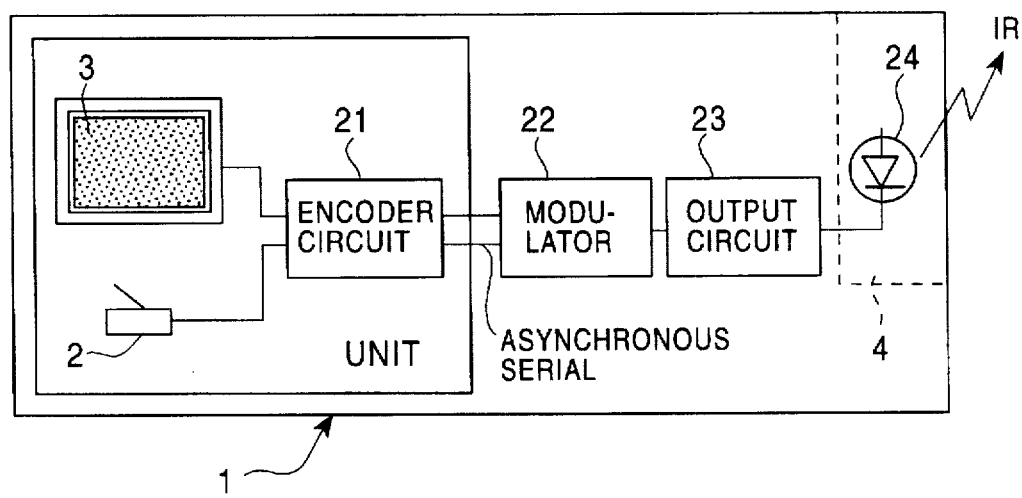
FIG. 2 is a block diagram showing the internal electrical configuration of the remote commander shown in FIG. 1.

FIG. 2 shows the internal configuration of an example of the remote commander 1. The pad 3 is arranged to detect position coordinates of its surface portion touched by a finger of a user and to output the position coordinates to an encoder circuit 21. The encoder circuit 21 encodes the position coordinates supplied from the pad 3 and the signal corresponding to the operation of the switch 2 to form an asynchronous serial signal. The encoder circuit 21 outputs this asynchronous serial signal to a modulator 22. The pad 3 outputs, in a preset predetermined cycle during the time period in which it is touched by the finger, the coordinates representing the position at which it is touched by the finger. When the finger is moved apart from the pad 3, the output from the pad 3 is stopped.

The modulator 22 modulates a carrier having a frequency of 40 kHz with the signal supplied from the encoder circuit 21. This carrier signal is supplied to an infrared ray emitting diode 24 of the light emitting unit 4 through an output circuit 23 to be output as an infrared ray signal from the infrared ray emitting diode 24.

Figure 3:
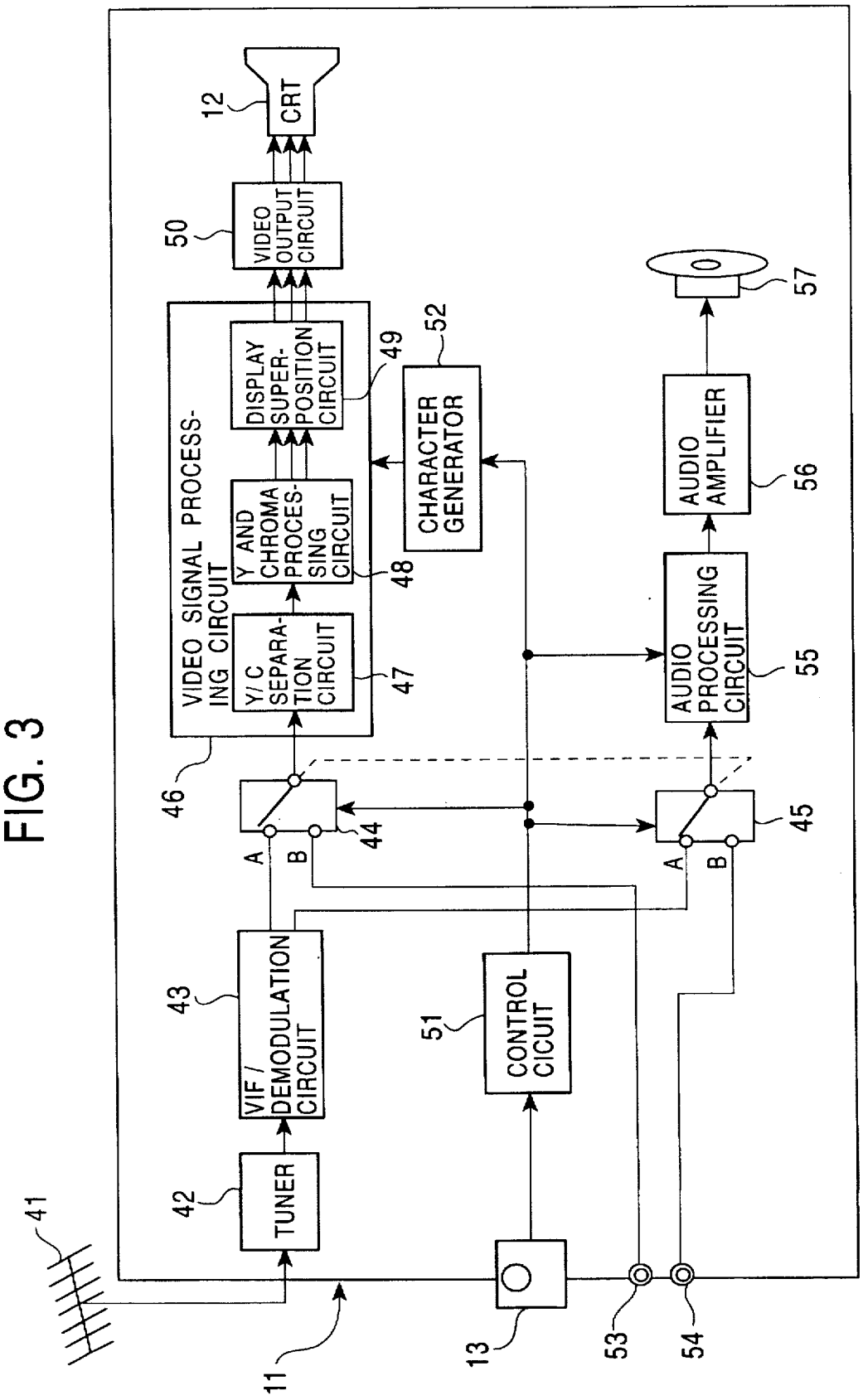
FIG. 3 is a block diagram showing the internal configuration of an example of the television receiver shown in FIG. 1.

FIG. 3 shows the internal configuration of an example of the television receiver 11. A tuner 42 receives electric waves of television broadcasting through an antenna 41, and outputs a detection output of the received electric waves to a video intermediate frequency (VIF)/demodulation circuit 43. The VIF/demodulation circuit 43 demodulates the intermediate frequency signal supplied from the tuner 42 to separate it into a video signal and an audio signal, and outputs the separated video and audio signals. The video signal is supplied to a video signal processing circuit 46 via a contact A of a switch 44 while the audio signal is supplied to an audio processing circuit 55 via a contact A of a switch 45.

In the video signal processing circuit 46, the input video signal is separated into a brightness signal (Y signal) and a chroma signal by a Y/C separation circuit 47, and the separated brightness signal and chroma signal are processed by a Y and chroma processing circuit 48. A display superposition circuit 49 superposes, on an output from the Y and chroma processing circuit 48, a video signal of an operation picture supplied from a character generator 52, and outputs the result of this superposition to the CRT 12 through a video output circuit 50.

On the other hand, the audio processing circuit 55 processes the input audio signal and outputs the result of processing to a speaker 57 through an audio amplifier 56.

A video signal or an audio signal input through a video input terminal 53 or an audio input terminal 54 is supplied to a corresponding one of a contact B of the switch 44 and a contact B of the switch 45. Each of the switches 44 and 45 selects the video signal or the audio signal input to the contact A or B, and outputs the selected signal to the video signal processing circuit 46 or the audio processing circuit 55.

A control circuit 51 formed of a microcomputer or the like is arranged to control the switches 44 and 45, the character generator 52, the audio processing circuit 55 and other various circuits according to control signals from the light receiving unit 3.

The operation of the above-described arrangement will now be described with reference to the flowchart of FIG. 4. First, a power supply for the television receiver 11 is turned on. To turn on this power supply, a power supply switch provided, for example, in a main body of the television receiver 11 may be switched on. Alternatively, a power supply button, not shown, may be provided in the remote commander 1 separately from the switch 2 and the pad 3. When this power supply button is switched on, an infrared ray signal is transmitted from the remote commander 1 to be received by the light receiving unit 13 of the television receiver 11. When the control circuit 51 detects this signal, it turns on the power supply for the television receiver 11. Further, the arrangement may alternatively be such that the power supply is turned on when a remote control signal including the position coordinates on the pad 3 or a signal of the operation of the switch 2 is received from the remote commander 1 while the power supply is off.

When the power supply is turned on, the tuner 42 is instructed to perform receiving through a predetermined channel (e.g., a first channel) preset as a default or a channel (last channel) received immediately before the preceding power supply shut-off and memorized in an internal memory. The tuner 42 receives electric waves in the channel corresponding to this instruction of the control circuit 51 and outputs an intermediate frequency (IF) signal of the received electric waves to the VIF/demodulation circuit 43. The VIF/demodulation circuit 43 demodulates the input intermediate frequency signal to obtain video and audio signals, and outputs the video signal to the Y/C separation circuit 47 of the video signal processing circuit 46 through the switch 44, which has been changed to the contact A side by the control circuit 51. Also, the audio signal output from the VIF/demodulation circuit 43 is input to the audio processing circuit 55 through the switch 45, which has been changed to the contact A side by the control circuit 51.

The Y/C separation circuit 47 separates brightness and chroma signals from each other and outputs these signals to the Y and chroma processing circuit 48. The Y signal and the chroma signals separately processed by the Y and chroma processing circuit 48 are output to the CRT 12 through the display superposition circuit 49 and the video output circuit 50. An image in the received channel is thereby displayed on the CRT 12.

Also, the audio signal processed by the audio signal processing circuit 55 is supplied to the speaker 57 through the audio amplifier 56 to radiate sound. Then the user can enjoy the image and sound in the predetermined channel.

Figure 4:
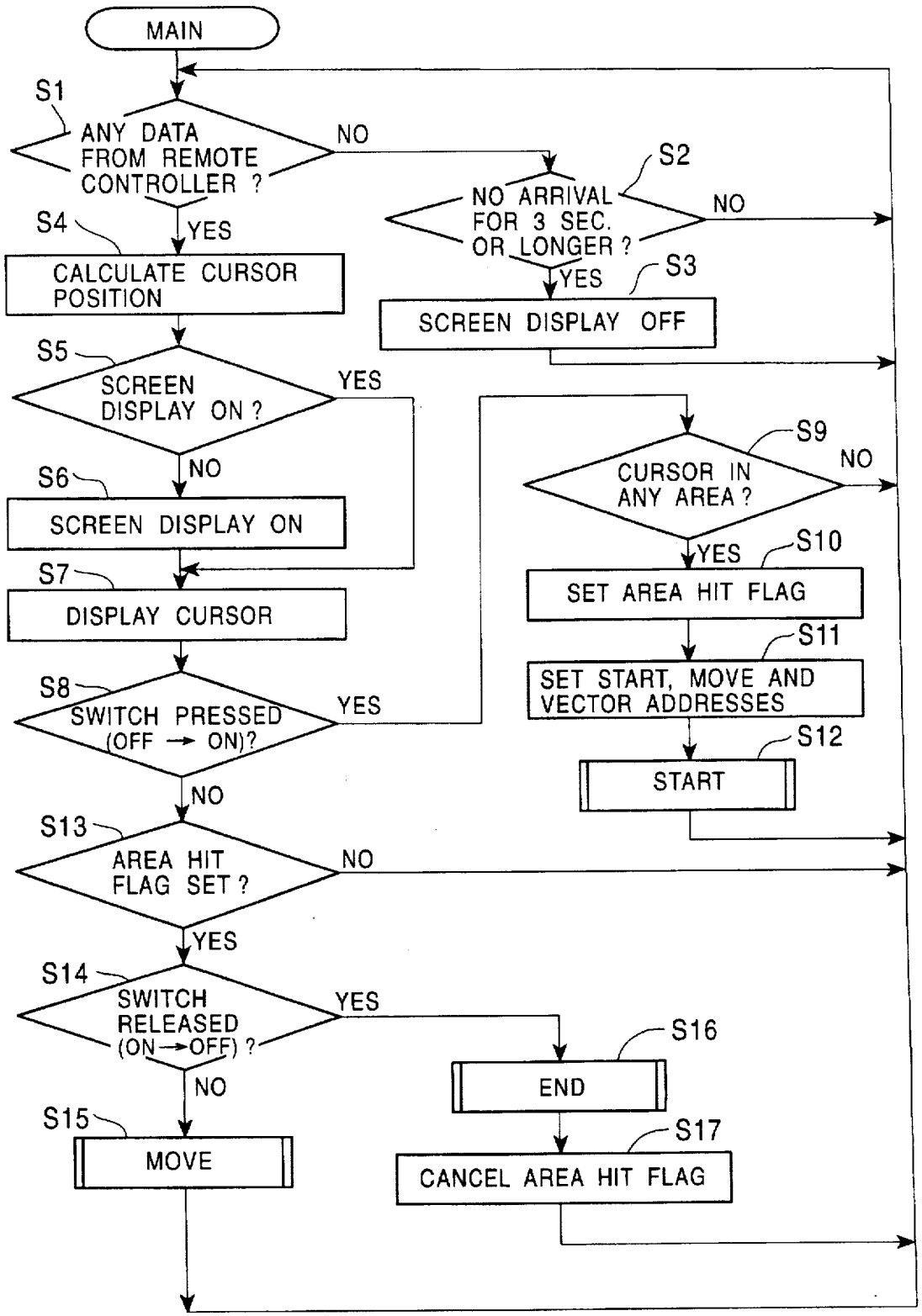
FIG. 4 is a flowchart for explaining the operation of the example shown in FIG. 3.

In such a state, the control circuit 51 executes the process shown in the flowchart of FIG. 4. First, in Step S1, determination is made as to whether an infrared ray signal from the remote commander 1 has been input. When the remote commander 1 is not operated, no infrared ray signal is output. When the user wishes to operate the television receiver 11 is operated, he or she touches the pad 3 by his or her finger. At this time, the pad 3 detects the corresponding position coordinates and outputs the detected position coordinates to the encoder circuit 21. A signal including the position coordinate data encoded by the encoder circuit 21 is supplied to the infrared ray emitting diode 24 through the modulator 22 and the output circuit 23 to be output as an infrared ray signal to the television receiver 11. In the television receiver 11, the control circuit 51 receives this signal through the light receiving unit 13.

When a signal is input from the remote commander in this manner, the process moves to step S4 and the control circuit 51 calculates the position of a cursor on the CRT 12 corresponding to the position coordinate data contained in the received remote control signal.

The process then advances to step S5 and determination is made as to whether a cursor and an operation picture generated by the character generator 52 are presently displayed on the screen of the CRT 12. In the present situation, no cursor and no operation picture are displayed. The process therefore advances to step S6 and display on the screen is executed. That is, at this time, the control circuit 51 controls the character generator 52 to generate a channel-tuning and sound volume operation picture.

The signal of the channel-tuning and sound volume operation picture generated by the character generator 52 is output to the display superposition circuit 49 to be superposed on the video signal supplied via the switch 44 and to be output to and displayed on the CRT 12 through the video output circuit 50. The channel-tuning and sound volume operation picture displayed in this manner is, for example, such as that shown in FIG. 5. For convenience' sake, in the example of display shown in FIG. 5 (also in examples shown in FIGS. 6 to 11), the video image corresponding to the video signal supplied via the switch 44 is omitted.

Figure 5:
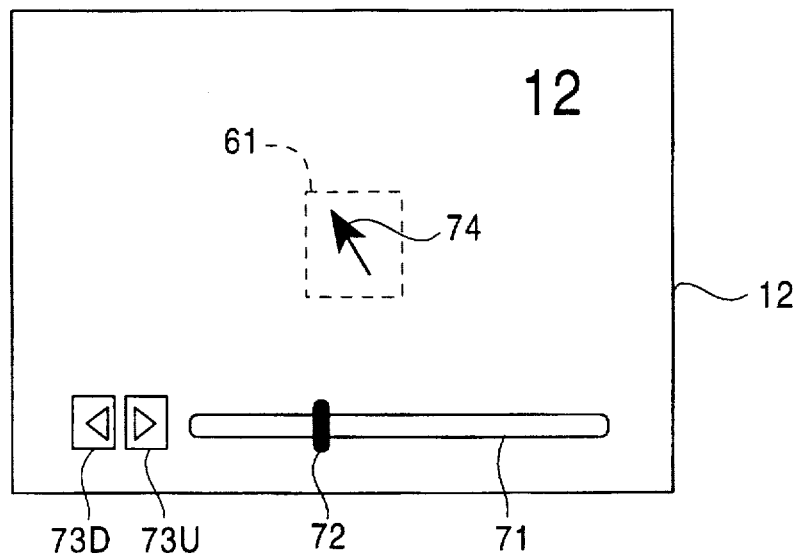
FIG. 5 is a diagram showing an example of a display of a channel-tuning and sound volume operation picture.

In the example of display shown in FIG. 5, a set of figures (12 in this example of display) indicating the channel of the television broadcast program presently received is displayed at an upper right position on the display screen of the CRT 12. A sound volume control bar 71 and a control knob 72 are displayed at a lower position on the screen. A sound volume up button 73U and a sound volume down button 73D are displayed on the left hand side of the sound volume control bar 71.

The process advances to step S7 and the control circuit 51 controls the character generator 52 to generate and display a cursor image at the position calculated in step S4. A cursor 74 is thereby displayed as shown in FIG. 5, for example.

The process then advances to step S8 and determination is made as to whether the switch 2 of the remote commander 1 has been pressed (changed from the off to the on state). In the present situation, the switch 2 is not pressed and is in the off state. In this case, the process moves to step S13 and determination is made as to whether an area hit flag has been set. This area hit flag is set in step S10, as described below. In the present situation, it is not set and the process therefore returns from step S13 to step S1 to repeat the execution of the processing from step S1.

Thus, when the pad 3 is first touched by a finger, the cursor 74 and the channel-tuning and sound volume operation picture are displayed on the CRT 12, as shown in FIG. 5.

Determination is again made in step S1 as to whether a remote control signal has been input from the remote commander 1. If no such input has been made, the process moves to step S2 and determination is made as to whether the state of receiving no remote control signal from the remote commander 1 has continued for 3 seconds or longer. If the time elapse during which no remote control signal is received is shorter than 3 seconds, the process again returns to step S1. That is, in this case, the state in which an operation picture such as that shown in FIG. 5 is displayed is continuously maintained.

On the other hand, if it is determined in step S2 that the state in which the remote commander 1 is not operated has continued for 3 seconds or longer, the process advances to step S3 to execute processing for turning off the display on the screen. That is, at this time, the control circuit 51 controls the character generator 52 to stop the generation of the operation picture continued up to this time. In the present situation, the cursor and the operation picture shown in FIG.

5 are erased and only the display of the video image (the video image in the 12th channel) supplied via the switch 44 is continued.

Figure 6:
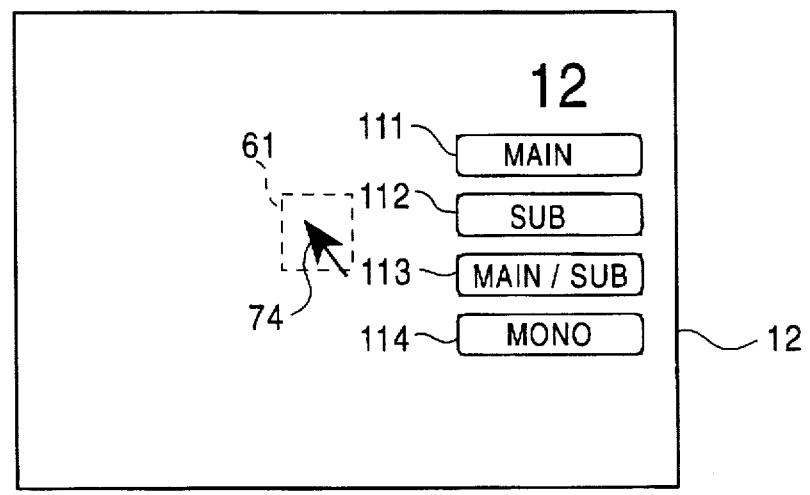
FIG. 6 is a diagram showing an example of a display of an audio mode operation picture.

If, while a channel-tuning and sound volume operation picture such as that shown in FIG. 5 is being displayed, the user moves and sets the cursor 74 to a generally-central position on the CRT 12 by operating a generally-central portion of the pad 3 and, in this state, turns on the switch 2, then the control circuit 51 controls the character generator 52 to generate an audio mode operation picture such as that shown in FIG. 6.

That is, if the user operates the switch 2 while a channel-tuning and sound volume operation picture such as that shown in FIG. 5 is being displayed, the process moves from step S1 to step S4 and the position of the cursor corresponding to the operated position is calculated. In step S5, determination is made as to whether a display is being made on the screen. Since a display is made on the screen in the present situation, the process moves to step S7 by jumping step S6 and the cursor 74 is displayed at the position calculated in step S4. In the present situation, the cursor 74 is displayed generally at the center of the screen.

In step S8, it is determined that the switch 2 of the remote commander 1 has been changed from the off state to the on state. The process then advances to step S9 and determination is made in step S9 as to whether the cursor 74 exists in a preset predetermined area. If the cursor 74 does not exist in the preset predetermined area, no special processing is performed and the process returns to step S1.

In this embodiment, an area 61 is set generally at the center of the CRT 12. In the present situation, the cursor 74 is positioned in the area 61 and the process therefore advances to step S10 to set the area hit flag. That is, information representing the existence of the cursor 74 positioned in the area 61 is stored in the control circuit 51.

The process then advances to step S11 and vector addresses of a start, a move and an end are set. A start vector address means an address with which a start program executed in step S12 by the control circuit 51 is stored, a move vector address means an address with which a move program to be next performed in step S15 is stored, and an end vector address means an address with which an end program to be finally performed in step S16 is stored. That is, a start program to be first performed when the cursor 74 is positioned in the area 61, a move program to be next performed when the cursor 74 is moved and an end program to be finally performed when the switch 2 of the remote commander 1 is changed from the on state to the off state (the operation of the switch 2 is canceled) are respectively set in step S11.

The process then advances to step S12 and the start program set in step S11 is executed. In the present situation, the control circuit 51 controls the character generator 52 to generate an audio mode operation picture such as that shown in FIG. 6 and to display this operation picture on the CRT 12.

As described above, the display is changed from the channel-tuning and sound volume operation picture shown in FIG. 5 to an audio mode operation picture such as that shown in FIG. 6 by positioning the cursor 74 in the central area 61 of the CRT 12 and by changing the switch 2 from the off state to the on state. If in this state the user changes the position of the finger on the pad 3 while maintaining the switch 2 in the on state, the process moves from step 1 to step S4 to calculate the position of the cursor. In step S7, the cursor is displayed at the position thereby calculated. That is, the cursor is moved. At this time, since the switch 2 is still maintained in the on state, it is determined in step S8 that the switch 2 is not changed from the off state to the on state, and the process moves to step S13. In step S13, it is determined that the area hit flag is set, and the process therefore advances to step S14. In step S14, determination is made as to whether the switch 2 has been released, that is, whether the switch 2 has been changed from the on state to the off state. Since the switch 2 is still in the on state, the process advances from step S14 to step S15 and move processing is executed.

In the present situation, however, the content of the move program is such that no special processing is performed. The process therefore returns to step S1 without specially performing processing.

When the user turns off the switch 2, it is determined in step S14 that the switch 2 is changed from the on state to the off state, and the process moves to step S16. In step S16, the end program set in step S11 is executed. In the present situation, the content of the end program is also such that no special processing is performed. Accordingly, the process advances to step S17 without specially performing processing. The area hit flag is canceled in step S17 and the process thereafter returns to step S1.

As described above, if the cursor 74 is placed at the center of the CRT 12 while the channel-tuning and sound volume operation picture shown in FIG. 5 is being displayed and if in this state the switch 2 is turned on one time, an audio mode operation picture such as that shown in FIG. 6 is displayed.

Figure 7:
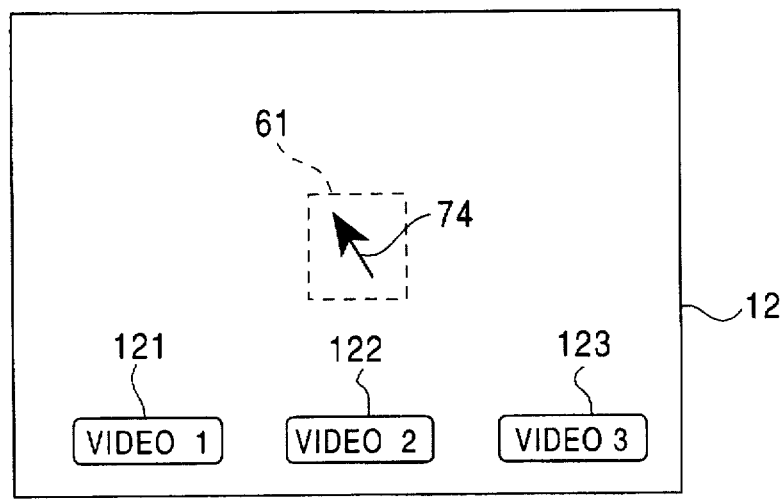
FIG. 7 is a diagram showing an example of a display of a video input operation picture.

Similarly, if the switch 2 is operated one time while the cursor 74 is placed in the central area 61 of the CRT 12 and while the audio mode operation picture shown in FIG. 6 is being displayed, the control circuit 51 makes the character generator 52 generate a video input operation picture such as that shown in FIG. 7 and display this image on the CRT 12.

Figure 8:
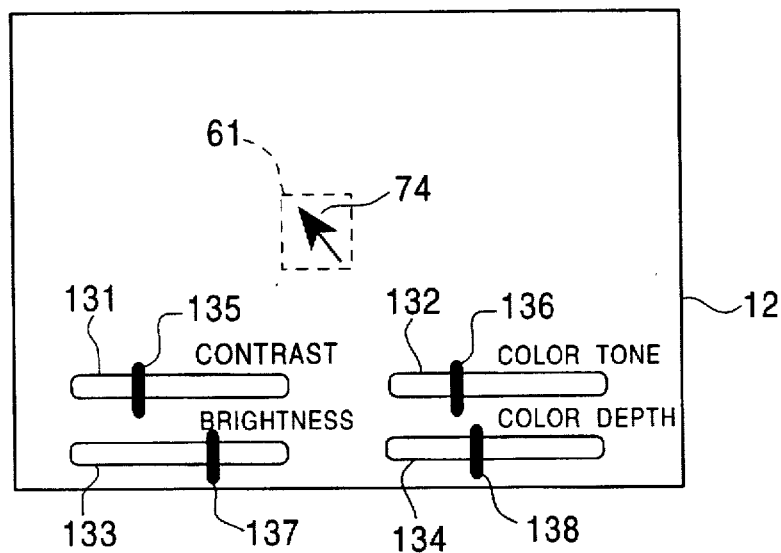
FIG. 8 is a diagram showing an example of a display of an image quality control operation picture.
Figure 9:
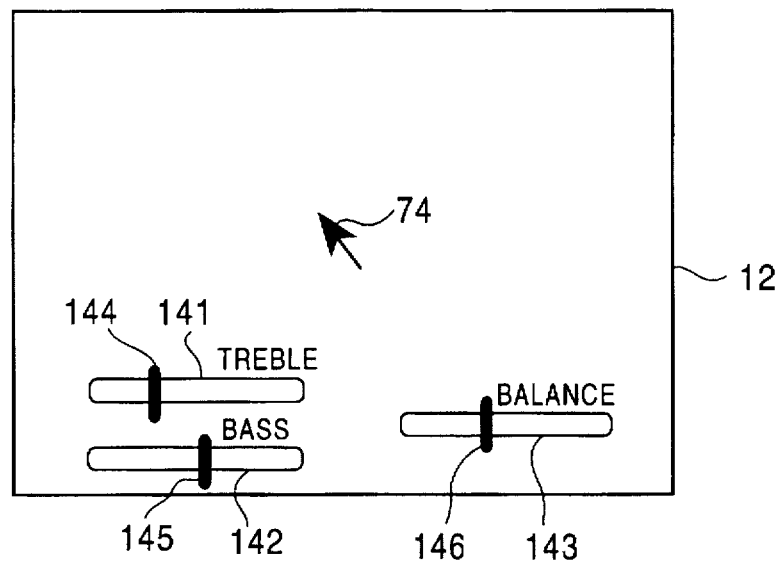
FIG. 9 is a diagram showing an example of a display of a tone control operation picture.

Also, if the cursor 74 is placed in the area 61 while the video input operation picture is being displayed and if the switch 2 is operated in this state, an image quality control operation picture such as that shown in FIG. 8 is displayed. If the cursor 74 is placed in the area 61 of the CRT 12 while the image quality control operation picture is being displayed and if the switch 2 is operated in this state, a tone control operation picture such as that shown in FIG. 9 is displayed.

As described above, if the cursor 74 is placed in the area 61 while the channel-tuning and sound volume operation picture shown in FIG. 5 is being displayed and if the switch 2 is turned on in this state, the display on the CRT 12 is successively changed one from another in the operation pictures shown in FIGS. 5 to 9.

In the audio mode operation picture shown in FIG. 6, buttons 111 to 114 for selecting one of main sound, sub sound, main and sub sound, and monaural sound are displayed together with the cursor 74.

In the video input operation picture shown in FIG. 7, buttons 121 to 123 for selecting one of video inputs "VIDEO 1", VIDEO 2 and VIDEO 3" are displayed together with the cursor 74.

In the image quality control operation picture shown in FIG. 8, bars 131 to 134 corresponding to the contrast, a color tone, brightness and color depth and control knobs 135 to 138 corresponding to these bars are displayed together with the cursor 74.

In the tone control operation picture shown in FIG. 9, bars 141 to 143 adapted for treble and bass control and balancing and control knobs 144 to 146 corresponding these control bars are displayed together with the cursor 74.

Figure 10:
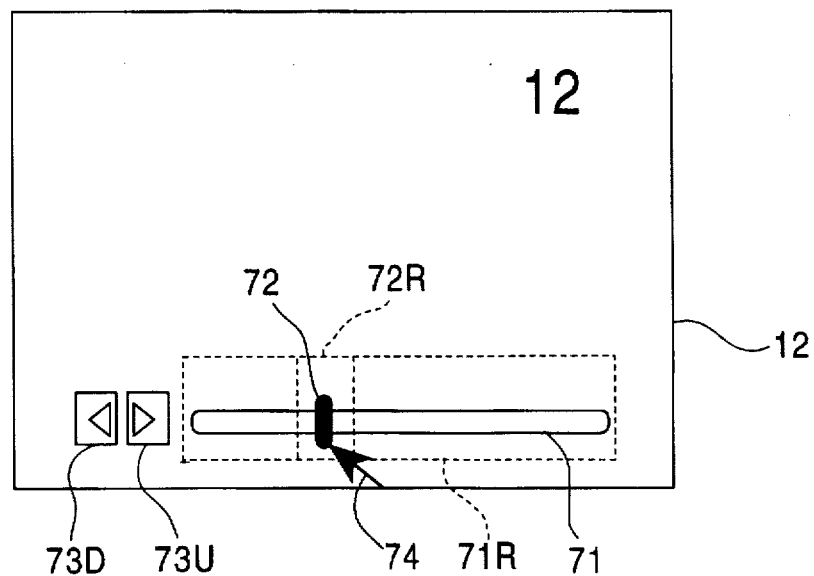
FIG. 10 is a diagram for explaining movement of control knob 72.

The operation will next be described with respect to the case of controlling, for example, the sound volume when the channel-tuning and sound volume operation picture shown in FIG. 5 is displayed. In this event, the user moves his or her finger on the pad 3 so that the cursor 74 moves onto the control knob 72 (or to a position in the vicinity of this knob), as shown in FIG. 10. When the user operates the switch 2 in this state, the change from the off state to the on state of the switch is detected in step S8. As shown in FIG. 10, an area 72R is set at and in the vicinity of the control knob 72. In this case, the cursor 74 is positioned in this area 72R. The process therefore advances from step S9 to step S10 to set the area hit flag. Thereafter, in step S11, programs of a start, a move and an end are set.

Figure 11:
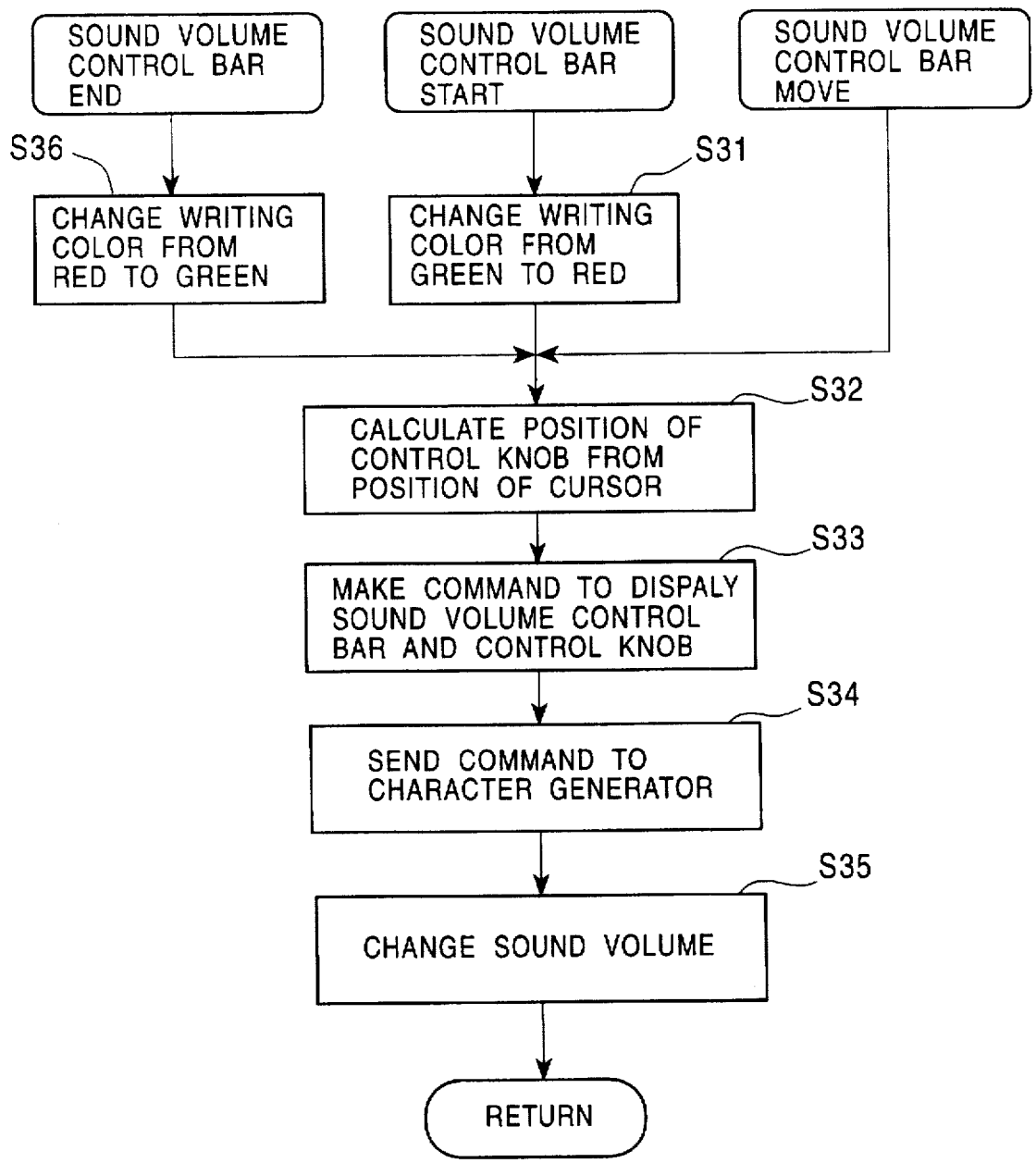
FIG. 11 is a flowchart for explaining processing for a start, a move and an end on the sound volume control bar in steps S12, S15 and S16 of FIG. 4.

Programs of a start, a move and an end of this sound volume control correspond to those shown in FIG. 11.

The program set with a start vector address is formed of steps S31 to S35, the program written with a move vector address is formed of steps S32 to S35, and the program written with an end vector address is formed of steps S36, and S32 to S35.

That is, when the processing of the start program is started in step S12 of FIG. 4, the control circuit 51 first changes, in step S31, the color of the control knob 72 shown in FIG. 10 from green, in which the knob has previously been displayed, to red. The process then advances to step S32 and the position of the control knob 72 is calculated from the position of the cursor 74. That is, the position of the control knob 72 is changed so as to be adjusted to the position of the cursor 74.

In step S33, a command is made in order to display the sound volume control bar 71 and the control knob 72. In step S34, the command is sent to the character generator 52. Next, the process advances to step S35 and the audio processing circuit 55 is controlled so as to change the sound volume to the level corresponding to the new position of the control knob 72 on the volume control bar 71.

In this case, as mentioned above, the color of the control knob 72 is changed from green to red in the state shown in FIG. 10, thereby enabling the user to recognize that sound volume control processing is started.

Next, if the user moves his or her finger on the pad 3 rightward while maintaining the switch 2 of the remote commander 1 in the on state, the position of the cursor 74 corresponding to the position coordinates from the pad 3 is calculated in step S4 of FIG. 4, and the cursor is displayed at the calculated position in step S7. Since the switch 2 is maintained in the on state, no change of the switch 2 is detected in step S8 and the process moves to step S14 via step S13. No change of the switch 2 is also detected in step S14 and the process therefore advances to step S15 to execute move processing.

This move processing is the processing from steps S32 to S35, as shown in FIG. 11. In step S32, a new position of the control knob 72 is calculated in correspondence with the new position of the cursor. In step S33, a command for displaying the sound volume control bar 71 and the control knob 72 at the position calculated in step S32 is made. In step S34, this command is sent to the character generator 52. The character generator 52 thereby generates an image such as that shown in FIG. 12, for example. This image is output to the CRT 12 to be displayed on the same. In step S35, the audio processing circuit 55 is controlled so as to set the sound volume to the level corresponding to the new position of the control knob 72. In the example shown in FIG. 12, the control knob 72 is moved rightward on the sound volume control bar 71, as is apparent from the comparison with the example of display shown in FIG. 10. Accordingly, the sound volume is changed to a higher level.

As described above, the user can increase (or reduce) the sound volume by moving his or her finger rightward (or leftward) on the pad 3 while continuing pressing the switch 2.

When the desired sound volume is reached, the user turns off the switch 2 (cancels the drag operation). At this time, it is determined in step S14 of FIG. 4 that the switch 2 is changed from the on state to the off state. The process then moves to step S16 to execute the end program. The processing performed in accordance with this end program is such that, as shown in FIG. 11, first in step S36, the color of the knob 72 changed from green to red in step S31 is again changed from red to green. That is, the control circuit 51 controls the character generator 52 to change the color of the control knob 72 from red to green. Next, processing from step S32 to S35 is executed. That is, the position of the control knob 72 corresponding to the position of the cursor is calculated and a command is made so that the control knob 72 is displayed at the calculated position. This command is sent to the character generator 52. The audio processing circuit 55 is controlled for adjustment to the sound volume corresponding to the position of the control knob 72.

Figure 12:
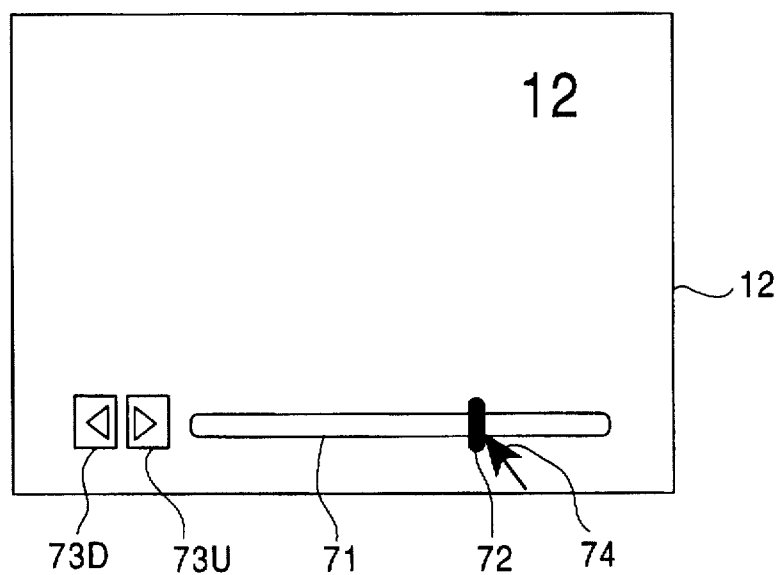
FIG. 12 is a diagram showing a state after moving control knob 72.

In this case, as described above, the color of the control knob 72 shown in FIG. 12 is changed from red to green, thereby enabling the user to recognize the completion of sound volume control processing and setting the sound volume corresponding to the displayed position of the control knob 72.

As shown in FIG. 10, an area 71R is set around the sound volume control bar 71. If the cursor 74 is set to designate a point on the area 71R remote from the control knob 72 (area 72R) instead of being dragged while being positioned in the area 72R in the vicinity of the control knob 72, then the control knob 72 is discontinuously moved to the corresponding position. Correspondingly, in this case, the sound volume is set at a time to the level corresponding to the position to which the control knob 72 is moved, instead of being gradually changed.

Further, if the cursor 74 is moved onto the sound volume up button 73U or the sound volume down button 73D and if the switch 2 is operated one time in this state, the control knob 72 is moved one step rightward or leftward and the sound volume is correspondingly increased or reduced. If the sound volume up button 73U or the sound volume down button 73D is designated with the cursor 74 and if the switch 2 is maintained in the on state, the control knob 72 is displayed while being continuously moved rightward or leftward step by step on a constant cycle for the time period before the switch 2 is turned off, thereby continuously increasing or reducing the sound volume.

Upon displaying the audio mode operation picture shown in FIG. 6, the mode for main sound, sub sound, both main and sub sounds, or monaural sound can be selected by turning on the switch 2 while superposing the cursor 74 on one of the buttons 111 to 114.

Upon displaying the video input operation picture shown in FIG. 7, one of video inputs "VIDEO 1, VIDEO 2 and VIDEO 3" can be selected by moving the cursor 74 onto the predetermined one of the buttons 121 to 123 and by turning on the switch 2 of the remote commander 1.

Upon displaying the image quality control operation picture shown in FIG. 8, contrast can be controlled by moving the control knob 135 to a predetermined position on the contrast control bar 131. Similarly, a color tone can be controlled by moving the control knob 136 on the color tone control bar 132. Also, brightness or color depth can be controlled by moving the control knob 137 to a predetermined position on the brightness control bar 133 or adjusting the position of the control knob 138 on the color depth control bar 134.

Further, upon displaying the tone control operation picture shown in FIG. 9, treble, bass or balance control can be performed by moving the control knob 144, 145, or 146 on the treble control bar 141, the bass control bar 142 or the balance control bar 142.

Figure 13:
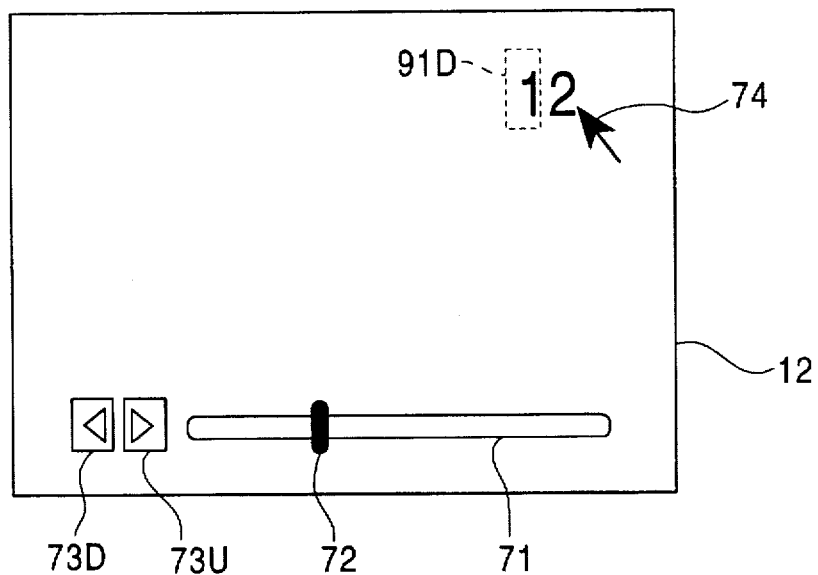
FIG. 13 is a diagram showing an area around the tens digit of a number representing a channel.
Figure 14:
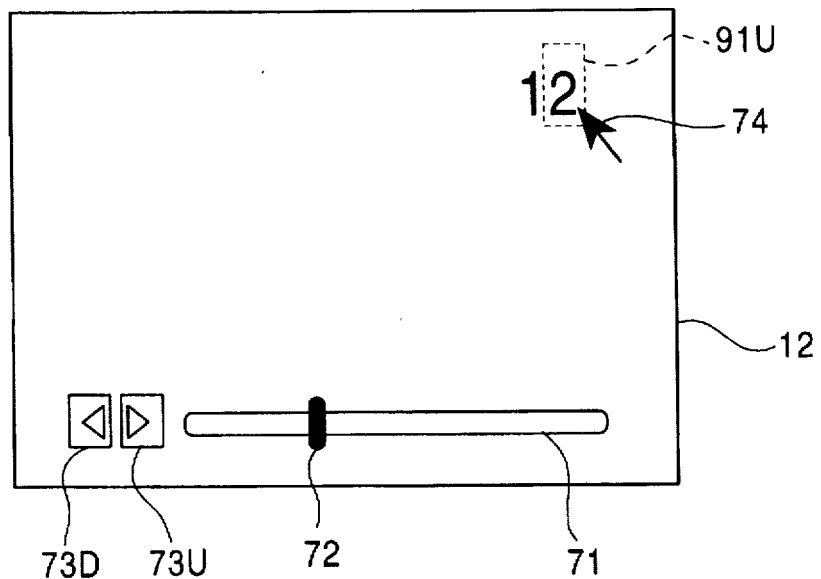
FIG. 14 is a diagram showing an area around the units digit of a number representing a channel.
Figure 15:
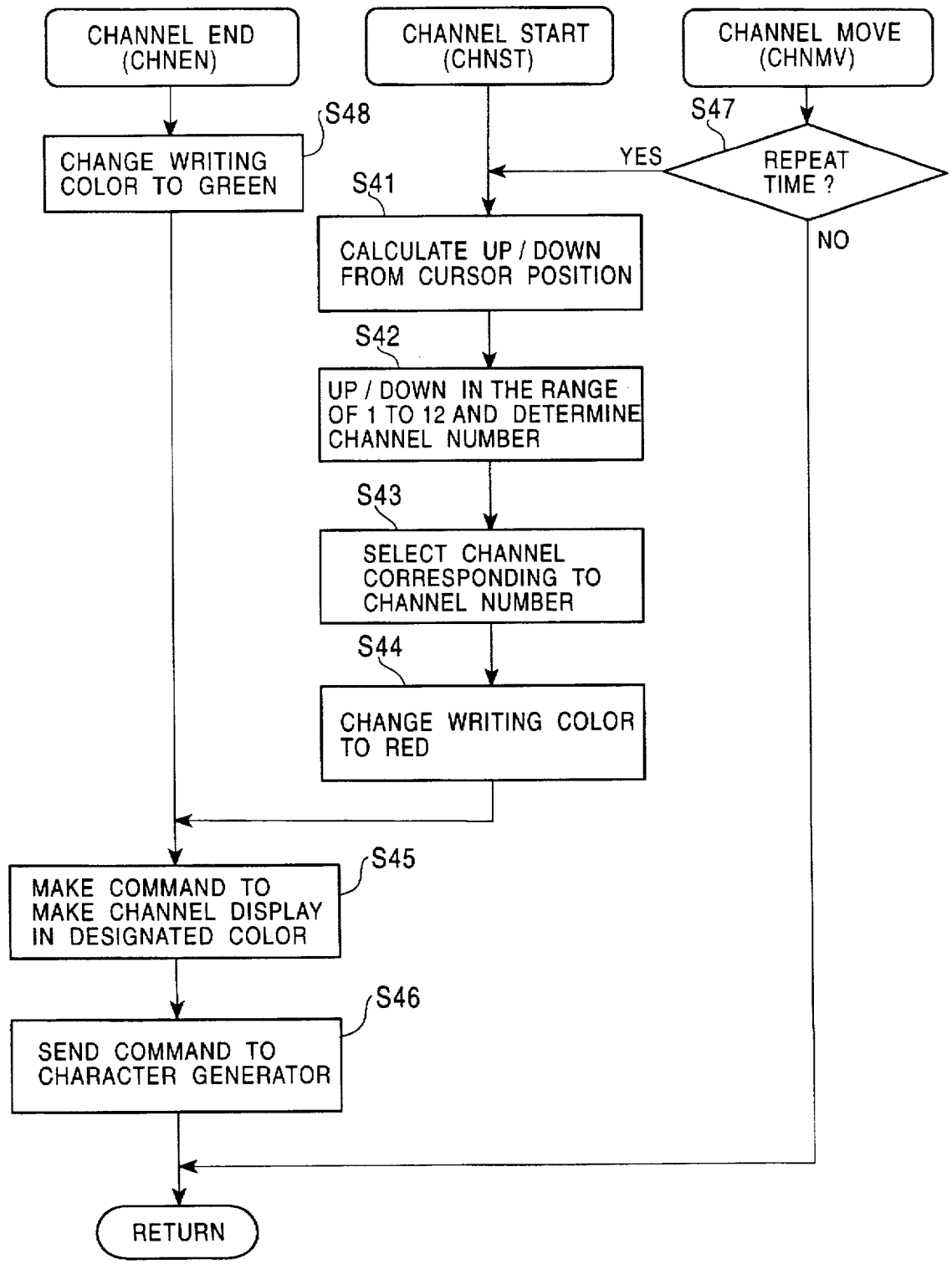
FIG. 15 is a flowchart for explaining channel start, move and end processings in steps S12, S15 and S16 of FIG. 4.

On the other hand, for example, as shown in FIG. 13, the switch 2 of the remote commander 1 may be turned on when the cursor 74 is moved into an area 91D formed around the tens digit (1 in the present situation) in the number representing a broadcasting channel, or, as shown in FIG. 14, the switch 2 may be turned on when the cursor 74 is positioned in an area 91U formed around the units digit (2 in the present situation) in the number representing a channel. Programs shown in FIG. 15 are thereby set as programs of a start, a move and an end in step S11 of FIG. 4.

That is, the start program is formed of steps S41 to S46, the move program is formed of steps S47, and S41 to S46, and the end program is formed of steps S48, S45, and S46.

For example, if, as shown in FIG. 13, the cursor 74 is positioned in the area 91D around the tens digit of the number representing a broadcasting channel and if the switch 2 of the remote commander 1 is turned on in this state, processing for calculating an up or down change from the cursor position in step S41 of the start program is executed. Since in the present situation the cursor 74 is positioned in the area 91D around the tens digit, a mode of reducing the channel number is set. Then, in step S42, a new channel number is determined in the range of the numbers from 1 to 12. In this case, the number representing a channel is 12, and it is reduced by 1 to set 11 as a new channel number.

Next, in step S43, a channel-tuning instruction corresponding to the channel number determined in step S42 (the 11th channel in this case) is sent to the tuner 42. The tuner 42 receives a broadcast in the 11th channel in accordance with this instruction, and a video image in the 11th channel is displayed on the CRT 12.

Next, in step S44, the number representing the broadcasting channel (11 in this case) is set in red. Since the number 12 has been displayed in green, this change in color enables the user to know that a change mode for changing the channel is set.

Figure 16:
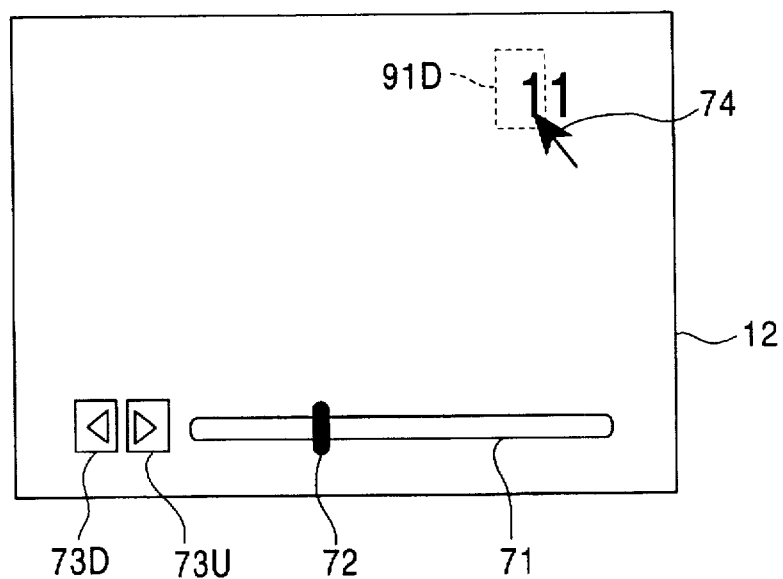
FIG. 16 is a diagram showing an example of a display in which a channel number is reduced.

Next, in step S45, a command for displaying the number representing the channel in the color designated in step S44 (red in this case) is made. In step S46, this command is output to the character generator 52. The character generator 52 displays the number 11 of the broadcasting channel in red in accordance with this command, as shown in FIG. 16.

Move processing is then executed while the switch 2 is being continuously maintained in the on state. In this case, determination is first made in step S47 as to whether a preset repeat time (e.g., 1 sec.) has elapsed. If this time period has not elapsed, the processing is terminated.

If it is determined that the present repeat time has elapsed after the change of the channel number, the processing of steps S41 to S46 is executed. That is, the same processing as the above-described start processing is executed. The number representing the channel is thereby reduced further by 1.

Thus, if the user continuously maintains the switch 2 in the on state, the number representing a channel is reduced by 1 every repeat time, thereby successively performing receiving and displaying in the corresponding channels.

When the user changes the switch 2 from the on state to the off state, the end program is executed. First, in step S48 in this program, the color of the number representing a channel is changed from red to green. Next, in step S45, a command for displaying the channel number in the color designated in step S48 (green in this case) is made. In step S46, this command is sent to the character generator 52. Consequently, the color of the number at the time when the user released the switch 2 is changed from red to green, thereby completing the processing. The user is thereby enabled to recognize the completion of the channel change mode.

If the user releases the switch 2 before the elapse of the first repeat time period, this end program is immediately executed. In this case, the channel number is reduced by 1 when the switch 2 is operated one time. Accordingly, if this operation is repeatedly executed, the received channel number is reduced by 1 each time the switch 2 is operated.

Figure 17:
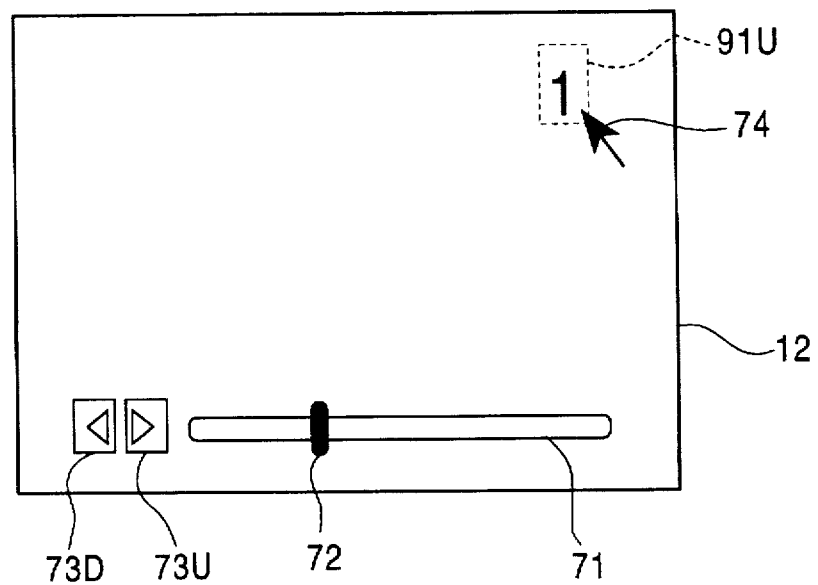
FIG. 17 is a diagram showing an example of a display in which a channel number is increased.

On the other hand, if, as shown in FIG. 14, the cursor 74 is positioned in the area 91U in the vicinity of the units digit of the number representing a channel and if the switch 2 is turned on in this state, the basically the same processing as the case of placing the cursor 74 in the area 91D in the vicinity of the tens digit is executed. In this case, however, the number is increased. That is, an increase mode is set in step S41, and the number representing a channel is increased by 1 in step S42. If a set of figures 12 has been displayed as a channel number as shown in FIG. 14, a FIG. 1 is displayed as shown in FIG. 17 and is successively replaced by 2, 3, 4, ....

Figure 18:
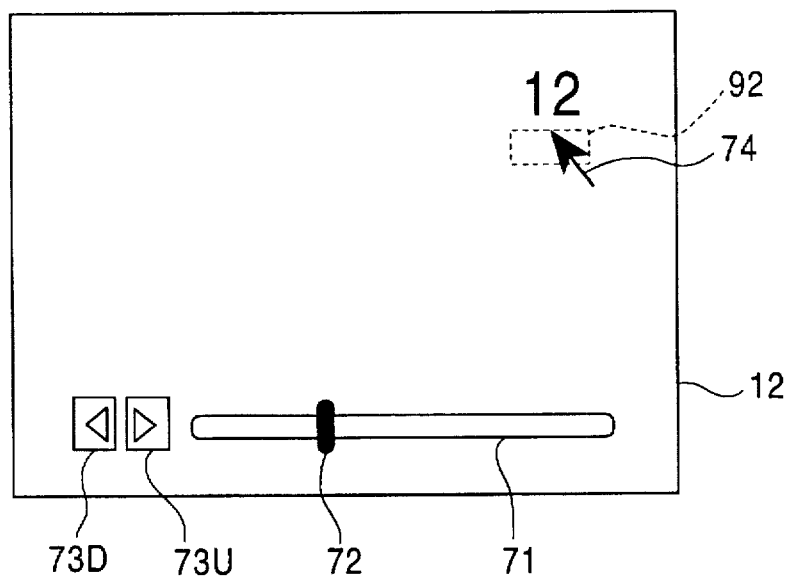
FIG. 18 is a diagram showing an area below a channel number.
Figure 19:
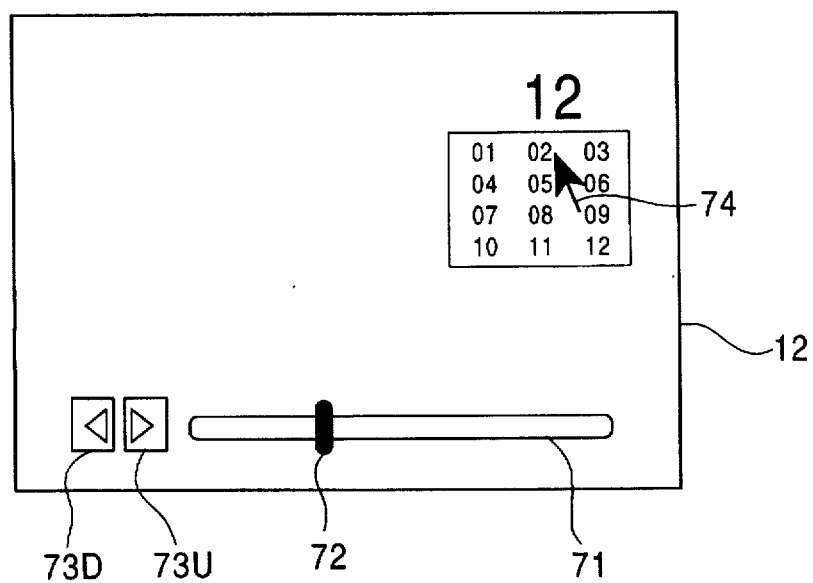
FIG. 19 is a diagram showing an example of a display in the case where the area shown in FIG. 18 is selected.

In this embodiment, the units digits or tens digit of a number presenting a channel is designated as shown in FIG. 13 or 14 and the switch 2 is operated in this state, thereby changing channels one by one. Further, as shown in FIG. 18, an area 92 is set below a set of figures which represents a channel. If this area 92 is designated with the cursor 74 and if the switch 2 is turned on, all numbers representing receivable channels in 1 to 12 are displayed below the figures representing a channel in accordance with the program set in step S11 shown in FIG. 4, as shown in FIG. 19. The user can designate the desired one of the numbers 1 to 12 with the cursor 74, thereby selecting receiving through the channel corresponding to the designated number.

Figure 20:
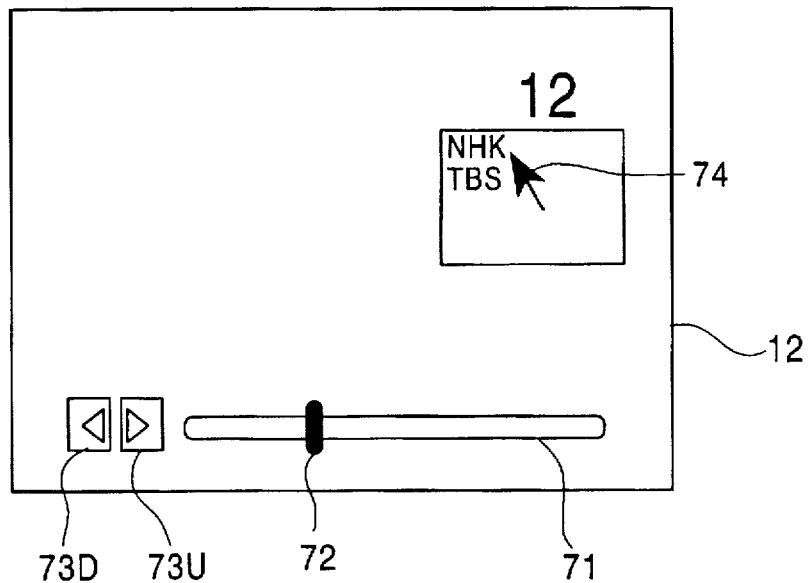
FIG. 20 is a diagram showing another example of the display in the case where the area shown in FIG. 18 is selected.

In such a case, names of broadcasting stations may be displayed, a shown in FIG. 20, instead of only displaying numbers representing channels. Also in this case, a broadcast from one of the broadcasting stations can be selected and received by designating a predetermined name of the broadcasting station with the cursor 74.

Figure 21:
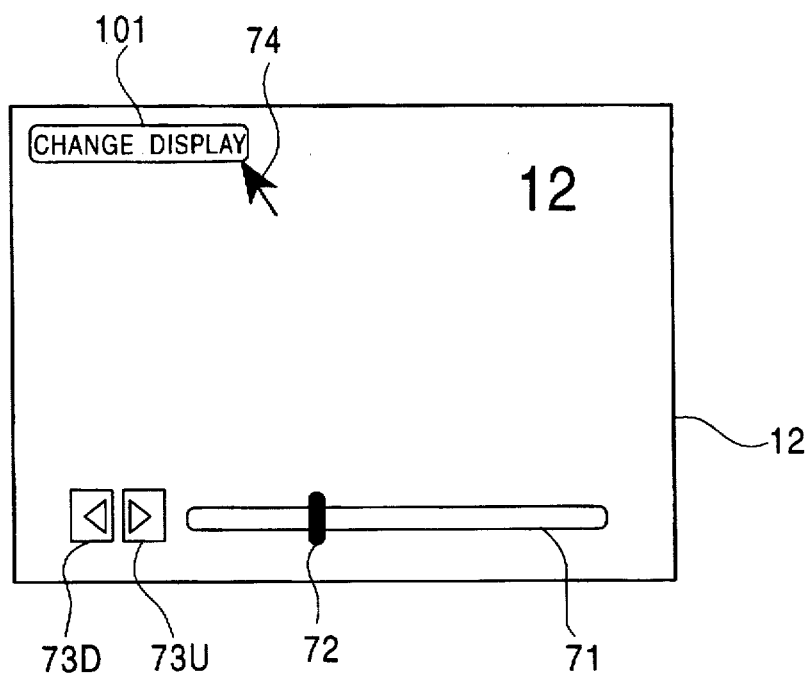
FIG. 21 is a diagram showing another example of the display of the channel-tuning and sound volume control picture.
Figure 22:
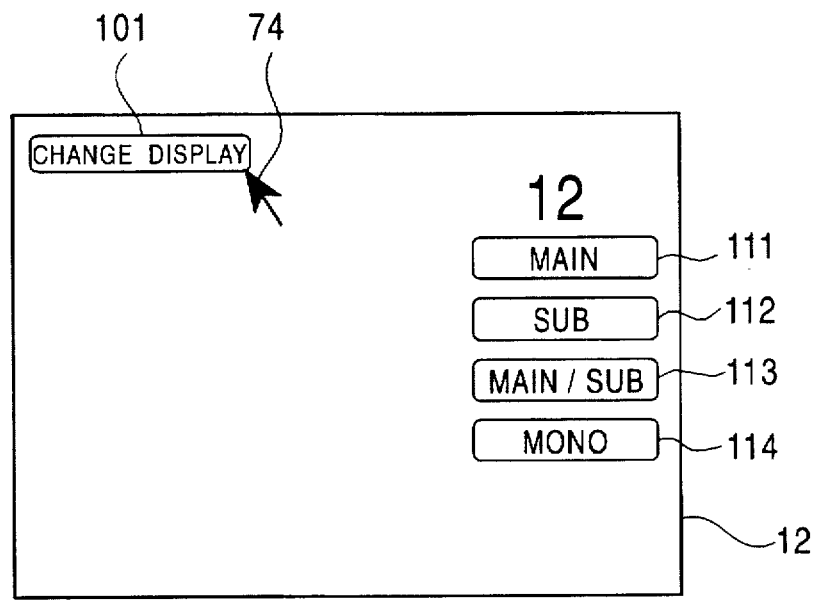
FIG. 22 is a diagram showing another example of the display of the audio mode operation picture.
Figure 23:
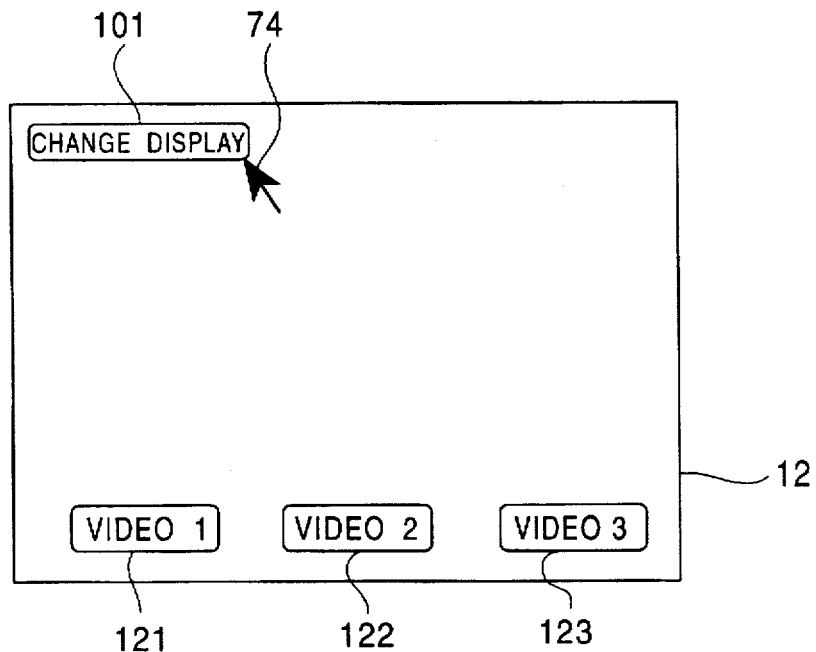
FIG. 23 is a diagram showing another example of the display of the video input operation picture.
Figure 24:
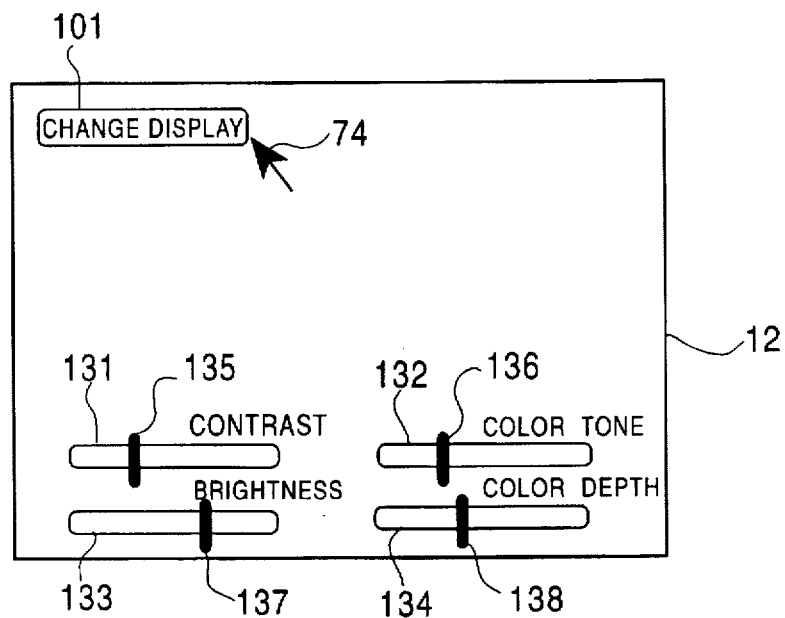
FIG. 24 is a diagram showing another example of the display of the image quality control operation picture.
Figure 25:
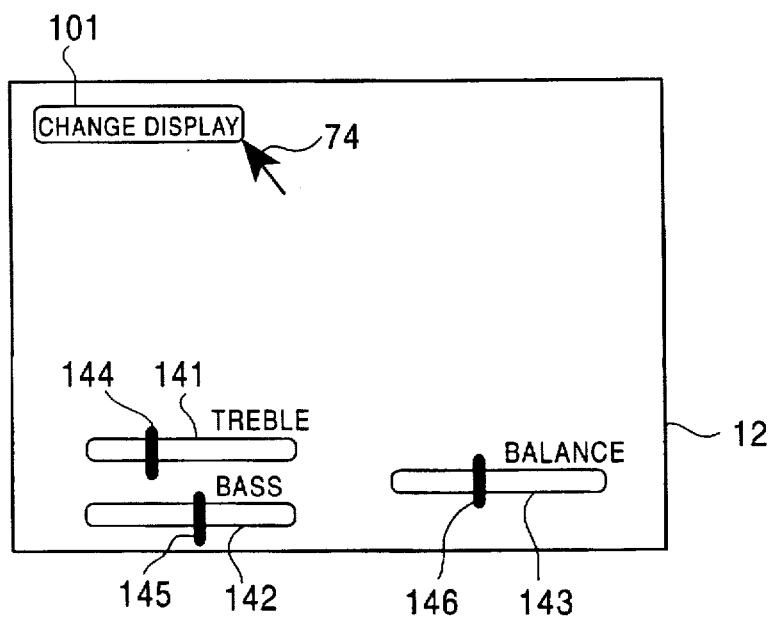
FIG. 25 is a diagram showing another example of the display of the tone control operation picture.

In the above-described embodiment, different operation pictures are successively displayed by designating the central area 61 of the CRT 12 with the cursor 74, as shown in FIGS. 5 to 9. In the channel-tuning and sound volume operation picture first displayed in step S6 of FIG. 4, however, a display change button 101 may be provided, as shown in FIG. 21. In this case, each time the switch 2 is turned on while designating the display change button 101 with the cursor 74, the operation picture is successively changed to an audio mode operation picture shown in FIG. 22, to a video input operation picture shown in FIG. 23, to an image quality control operation picture shown in FIG. 24, and to a tone control operation picture shown in FIG. 25.

Figure 26:
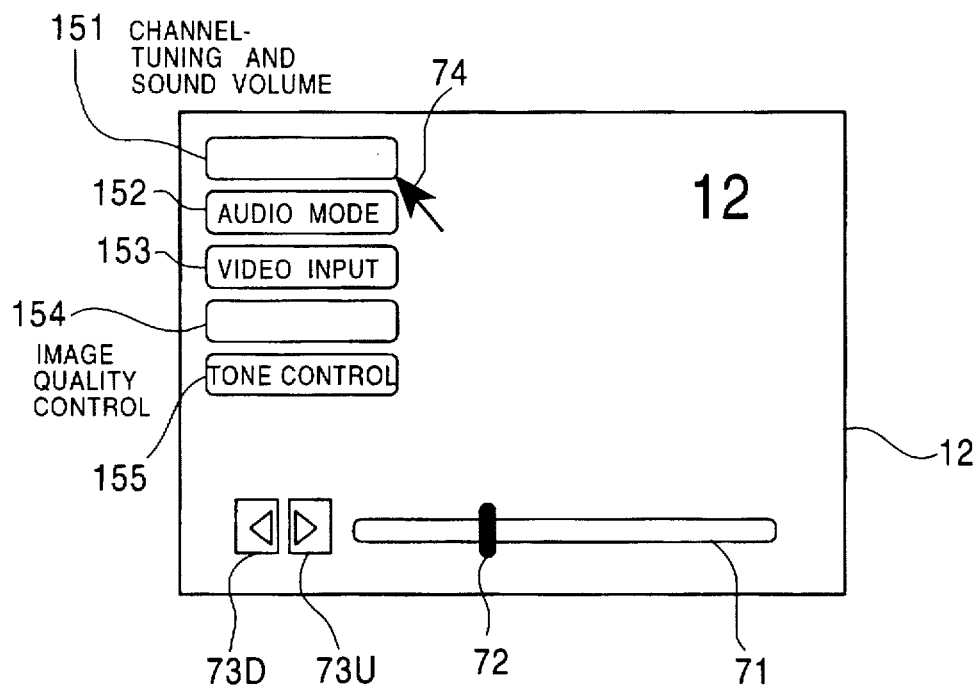
FIG. 26 is a diagram showing still another example of the display of the channel-tuning and sound volume operation picture.
Figure 27:
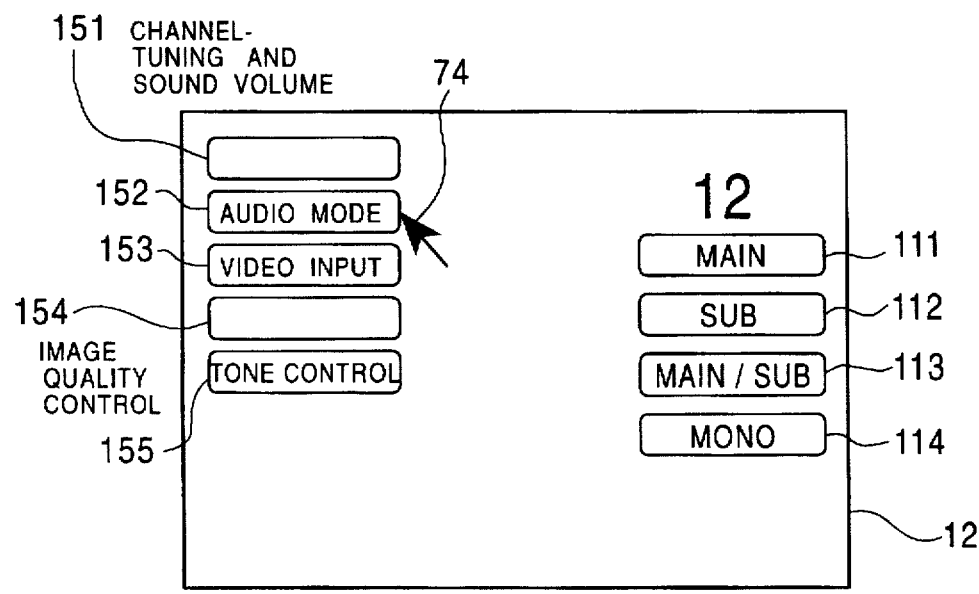
FIG. 27 is a diagram showing still another example of the display of the audio mode operation picture.
Figure 28:
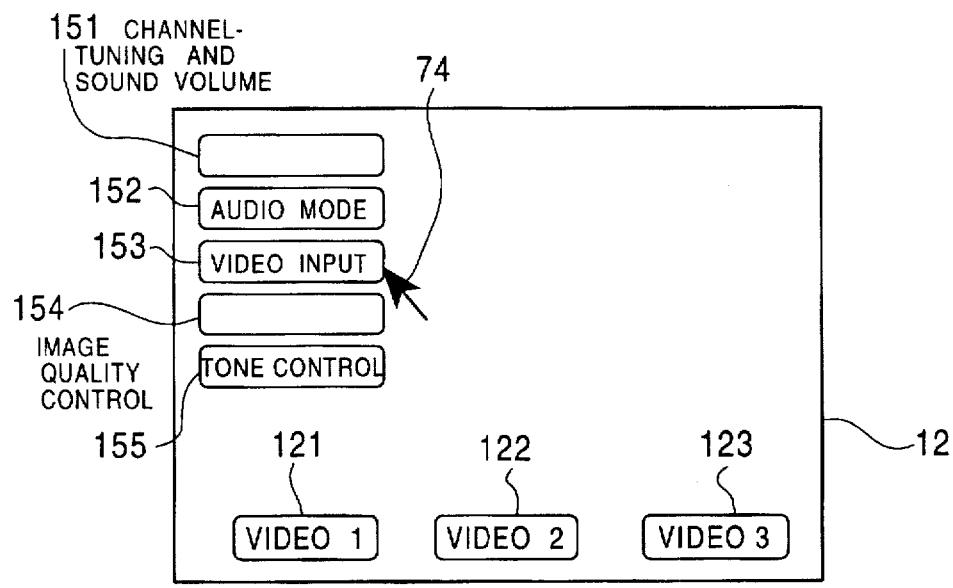
FIG. 28 is a diagram showing still another example of the display of the video input operation picture.
Figure 29:
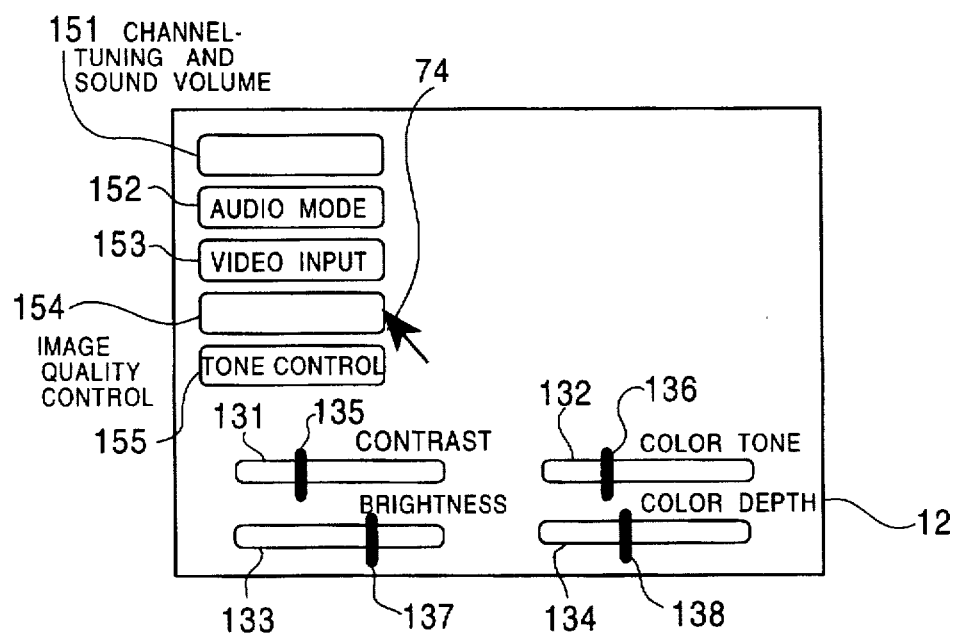
FIG. 29 is a diagram showing still another example of the display of the image quality control operation picture.
Figure 30:
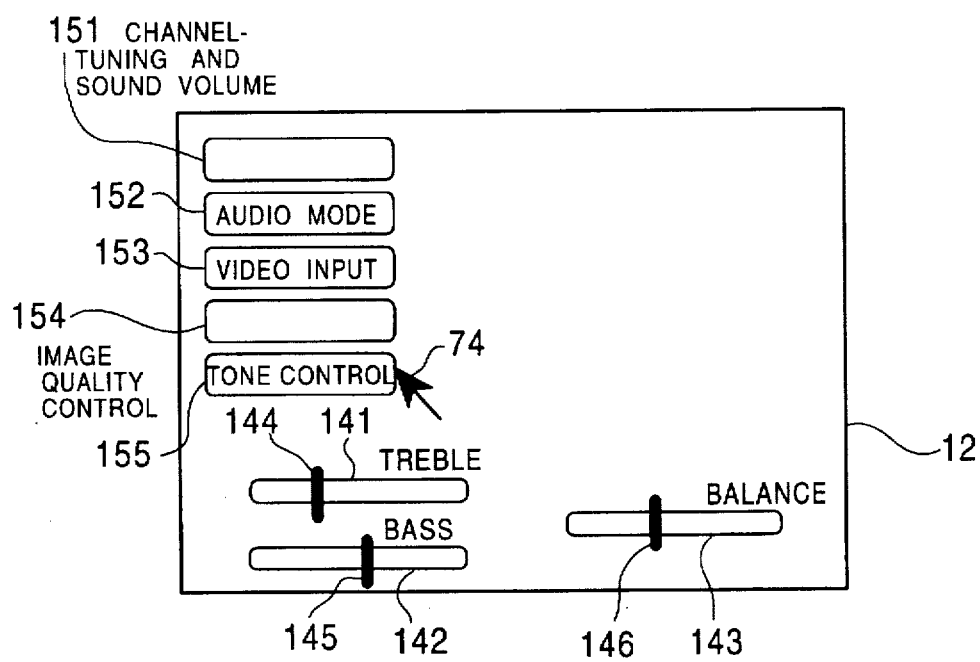
FIG. 30 is a diagram showing still another example of the display of the tone control operation picture.

Alternatively, for example, in the channel-tuning and sound volume operation picture first displayed in step S6 of FIG. 4, patterns 151 to 155 for channel-tuning and sound volume, audio mode, video input, image quality control and tone control may be displayed, as shown in FIG. 26. In this case, a predetermined one of the modes can be selected by designating the corresponding one of the buttons 151 to 155 with the cursor 74 and by turning on the switch 2. That is, if the audio mode button 152 is selected, an audio mode operation picture such as that shown in FIG. 27 is displayed. If the video input button 153 is selected, a video input operation picture such as that shown in FIG. 28 is displayed. If the image quality control button 154 is selected, an image quality control operation picture such as that shown in FIG. 29 is displayed. Further, if the tone control button 155 is selected, a tone control operation picture such as that shown in FIG. 30 is displayed.

In the above-described embodiment, each of the functions of channel-tuning and sound volume, audio mode, video input, image quality control and tone control is controlled. However, the present invention can also be applied to control of any other functions. The embodiment has been described with respect to a television receiver as an example of an electronic apparatus to be controlled in accordance with the present invention. The present invention, however, can also be applied to remote control of a computer unit or the like. In such a case, operation pictures are displayed on a monitor connected to a computer to perform various kinds of operation.

According to the present invention, as described above, the cursor is moved to a position corresponding to position coordinates representing an operated position on the pad, and, when an operating signal from the remote commander is received, the function corresponding to a operation picture on which the cursor is positioned at the corresponding time is executed. Therefore, the number of button switches of the remote commander can be reduced. Also, the cursor can be speedily moved to the desired position to select the desired function speedily and reliably. Thus, the facility of the operation is improved.

What is claimed is:

1. A combination of an electronic apparatus and a remote controller for controlling the electronic apparatus, said remote controller comprising:

a pad for designating coordinates by being touched by a user;

encoding means for encoding designated coordinate information obtained from said pad;

a switch operated by the user; and means for forming a control signal from the encoded coordinate information and operation information of said switch and for transmitting the control signal in a wireless manner to said electronic apparatus, said electronic apparatus comprising:

receiving means for receiving the control signal from said remote controller; and control means for controlling said electronic apparatus, said control means displaying a cursor and an operation picture for operating said electronic apparatus on a display unit in accordance with the received control signal, in which said display unit is provided in or connected to said electronic apparatus and is not provided in said remote controller, wherein said user can control a plurality of operating functions of said electronic apparatus through the use of said switch and said pad of said remote controller.

2. A combination of an electronic apparatus and a remote controller according to claim 1, wherein the forming and transmitting means of said remote controller includes:

modulation means for modulating a signal representing the encoded coordinate information and the operation information of said switch at a predetermined frequency; and infrared ray emitting means supplied with the modulated signal modulated from said modulation means.

3. A combination of an electronic apparatus and a remote controller according to claim 1, wherein said control means of said electronic apparatus includes means for calculating, on the basis of the received control signal, a position at which the cursor is to be displayed on the display unit.

4. A combination of an electronic apparatus and a remote controller according to claim 3, wherein said control means of said electronic apparatus further includes state change detection means for detecting a change in the state of said switch of said remote controller on the basis of the received control signal.

5. A combination of an electronic apparatus and a remote controller according to claim 4, wherein said state change detection means detects whether said switch is changed from the on state to the off state or from the off state to the on state.

6. A combination of an electronic apparatus and a remote controller according to claim 5, wherein said control means of said electronic apparatus further includes determination means for making determination as to whether the cursor is positioned in a preset area on said display unit.

7. A combination of an electronic apparatus and a remote controller according to claim 6, wherein said electronic apparatus comprises a television receiver.

8. A combination of an electronic apparatus and a remote controller according to claim 7, wherein said operation picture comprises a picture for an operation of changing a sound volume.

9. A combination of an electronic apparatus and a remote controller according to claim 7, wherein said operation picture comprises a picture for setting an audio mode.

10. A combination of an electronic apparatus and a remote controller according to claim 7, wherein said operation picture comprises a picture for selecting a video input.

11. A combination of an electronic apparatus and a remote controller according to claim 7, wherein said operation picture comprises a picture for performing image quality control.

12. A combination of an electronic apparatus and a remote controller according to claim 7, wherein said operation picture comprises a picture for performing sound tone control.

13. A remote controller for controlling an electronic apparatus, said remote controller comprising:

a pad for designating coordinates by being touched by a user;

encoding means for encoding designated coordinate information obtained from said pad;

a switch operated by the user; and means for forming a control signal from the encoded coordinate information and operation information of said switch and for transmitting said control signal in a wireless manner to said electronic apparatus, wherein said user can control a plurality of operating functions of said electronic apparatus through the use of said switch and said pad of said remote controller.

14. A remote controller according to claim 13, wherein the forming and transmitting means includes:

modulation means for modulating a signal representing the encoded coordination information and the operation information of said switch at a predetermined frequency; and infrared ray emitting means supplied with the modulated signal from said modulation means.

15. A remote controller according to claim 14, wherein said encoding means forms an asynchronous serial signal from the encoded information, and supplies the asynchronous serial signal to said modulation means.

16. A method of remote-controlling an electronic apparatus comprising the steps of:

detecting coordinates of a position on a pad provided on a remote controller, at which position the pad is touched by a user;

encoding detected coordinate information;

detecting, as operation information, whether a switch provided in the remote controller has been operated by the user;

forming a control signal from the encoded coordinate information and the detected operation information of the switch and transmitting the control signal in a wireless manner to said electronic apparatus;

receiving the output control signal in said electronic apparatus; and displaying a cursor and an operation picture for operating the electronic apparatus on a display unit in accordance with the received control signal, in which said display unit is provided in or connected to the electronic apparatus and is not provided in said remote controller, wherein said user can control a plurality of operating functions of said electronic apparatus through the use of said switch and said pad of said remote controller.

17. A method according to claim 16, further comprising the steps of:

modulating a signal representing the encoded coordinate information and the switch operation information at a predetermined frequency; and supplying the modulated signal to infrared ray emitting means.

18. A method according to claim 17, further comprising the step of calculating, on the basis of the received control signal, a position at which the cursor is to be displayed on the display unit.

19. A method according to claim 18, further comprising the step of detecting a change in the state of the switch of the remote controller on the basis of the received control signal.

20. A method according to claim 19, further comprising the step of determining whether the cursor is positioned in a preset area on the display unit.

21. A combination of an electronic apparatus and a remote controller for controlling the electronic apparatus, said remote controller comprising:

a pad device for generating a location signal in response to being touched by an operator, in which said location signal corresponds to a location on a display unit provided in said electronic apparatus;

a single switch operable by the operator; and means for forming a control signal from said location signal and operation information of said switch and for transmitting said control signal in a wireless manner to said electronic apparatus, said electronic apparatus comprising:

receiving means for receiving said control signal from said remote controller; and control means for controlling said electronic apparatus, said control means displaying a cursor and an operation picture for operating said electronic apparatus on said display unit in accordance with the received control signal, in which said display unit is provided in or connected to said electronic apparatus and is not provided in said remote controller, wherein said operator can control a plurality of operating functions of said electronic apparatus through the use of said single switch and said pad of said remote controller.

* * * * *